United States Patent [19]

Higashimura et al.

[11] Patent Number: 4,755,193
[45] Date of Patent: Jul. 5, 1988

[54] POLYMER AND A MEMBRANE HAVING AN IMPROVED GAS-PERMEABILITY AND SELECTIVITY

[75] Inventors: Toshinobu Higashimura, 35, Kitashirakawa-Ioricho, Sakyo-ku, Kyoto; Toshio Masuda, Otsu; Koichi Takada, Honmachi, all of Japan

[73] Assignees: Toshinobu Higashimura; Sanyo Chemical Industries, Ltd., both of Tokyo, Japan

[21] Appl. No.: 536,722

[22] Filed: Sep. 28, 1983

[30] Foreign Application Priority Data

Feb. 23, 1983 [JP] Japan .................................. 58-29786

[51] Int. Cl.$^4$ ............................................. B01D 13/00
[52] U.S. Cl. ..................................... 55/16; 210/500.36
[58] Field of Search ................ 210/654, 500.2, 500.36; 55/16, 158

[56] References Cited

U.S. PATENT DOCUMENTS 3,611,676  10/1971  Christen et al. ........................ 55/16
4,199,448  4/1980   Johnson et al. ...................... 210/654
4,239,793  12/1980  Matsuura et al. .................... 428/216

OTHER PUBLICATIONS

Toshio Masuda, Toru Takahashi, and Toshinobu Higashimura, J. Chem. Soc., Chem. Commun, 1982, "Synthesis of High Polymers from Disubstituted Acetylenes Using Halides of Niobium (v) and Tantalum (v) as Catalysts", pp. 1297-1298.

Toshinobu Higashimura, Toshio Masuda and Munehisa Okada, Polymer Bulletin 10, 114-117, (1983), "Gas Permeability of Polyacetylenes with Bulky Substitutents", pp. 114-117.

Primary Examiner—Frank Spear
Attorney, Agent, or Firm—Oblon, Fisher, Spivak, McClelland & Maier

[57] ABSTRACT

A permselective membrane having improved gas-permeability and selectivity is obtained from a polymer of 1-alkyldimethylsilyl-1-propyne.

18 Claims, 3 Drawing Sheets

POLYMER AND A MEMBRANE HAVING AN IMPROVED GAS-PERMEABILITY AND SELECTIVITY

BACKGROUND OF THE INVENTION

1. Field of the Invention

This invention relates to a film-forming polymer. More particularly, it relates to a polymer useful for a permselective membrane.

2. Description of the Prior Art

As the materials for producing permselective membranes, there have been known heretofore several polymers. For example, polydimethylsiloxanes and copolymers thereof with polycarbonates or others have been disclosed (U.S. Pat. Nos. 3,980,456, and 3,874,986; and Japan Patent Lay-open No. 26504/1981). Olefin polymers such as poly-4-methylpentene-1 have also been disclosed (Japan Patent Lay-open No. 4203/1982). However, these polymers can not fulfill all the fundamental requirements needed, for use as permselective membranes, namely good permeability and selectivity as well as processability to form thin film.

SUMMARY OF THE INVENTION

Accordingly, it is an object of the present invention to provide a polymer capable of forming a membrane having an improved gas-permeability.

It is another object of this invention to provide a polymer formable into a membrane having an improved selectivity.

It is still another object of this invention to provide a polymer which can be readily processed into a thin membrane.

It is yet another object of the invention to provide a permselective membrane article, for separating or enriching a specific gas from a gas mixture, having high gaseous permeability and other properties.

Briefly, these and other objects of the present invention which will become more readily apparent have been attained broadly by the discovery of a polymer having repeating units of the formula:

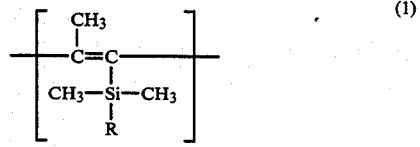

(1)

wherein R is an alkyl radical having 1–4 carbon atoms.

DETAILED DESCRIPTION OF THE PREFERRED EMBODIMENTS

Figure 1A:
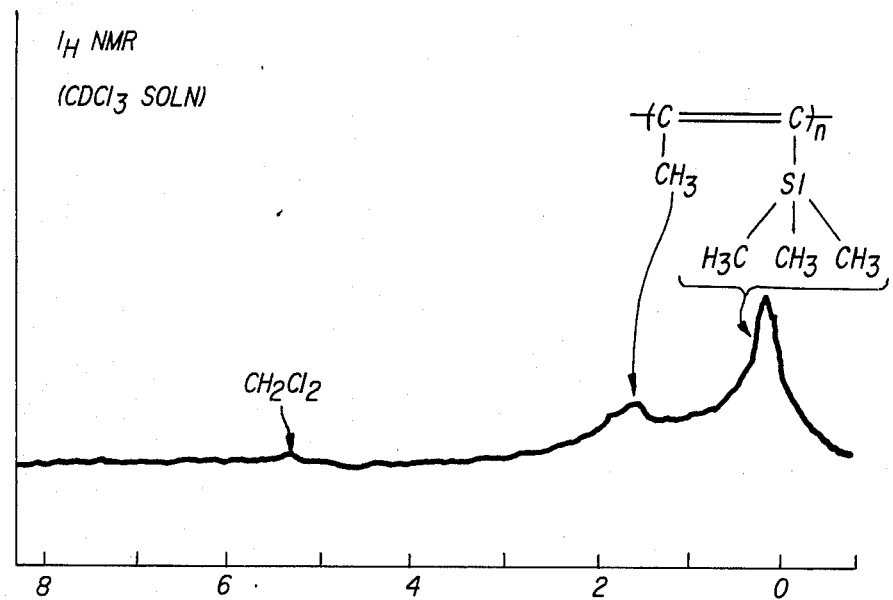
FIG. 1 is $^1$H NMR charts of a poly-1-trimethylsilyl propyne.

In formula (1), R is an alkyl radical, which may be straight-chain or branched. Examples of suitable alkyl radicals include methyl, ethyl, n- and i-propyl, and n-, i- and t-butyl radicals.

The polymer having repeating units of the formula (1) can be formed by polymerization of one or more 1-monoalkyl (C1–4) dimethylsilyl-propynes. Suitable monomers which can be used include, for example, 1-trimethylsilyl-propyne (sold by Petrarch System Inc. and Chisso Corp., T-3728), and 1-mono-n-propyldimethylsilyl propyne. The most preferred is 1-trimethylsilyl propyne.

Polymerization can be performed using as catalyst one or more compounds, including halides, of transition metals of group V of Periodic Table, such as niobium and tantalum. Examples of suitable catalysts include NbCl$_5$, TaCl$_5$, NbBr$_5$ and TaBr$_5$. The most preferred are TaCl$_5$ and TaBr$_5$. The catalyst is usually used in an amount of 0.01–20 mol %, preferably 0.5–5 mol %, based on the monomer.

Polymerization may be carried out in the presence of a solvent. Suitable solvents are, for instance, hydrocarbons, including aromatic hydrocarbons, such as benzene, toluene, o-, m- and p-xylenes, ethyl benzene, styrene and naphthalene, cycloaliphatic hydrocarbons, such as cyclohexane, methyl cyclohexane, ethyl cyclohexane and cyclohexene, aliphatic hydrocarbons, such as n-pentane, n- and i-hexanes, n-heptane, n- and i-octanes, 1-hexene, 1-heptene, petroleum ether, and the like; and halogenated hydrocarbons, such as 1,2-dichloroethane, carbon tetrachloride, chloroform, 1,2,3-trichloropropane, trichloroethylene, chlorobenzene, chloroethylbenzene, and the like; as well as mixtures of two or more of these solvents. Among these, preferred are toluene, cyclohexane, n-hexane, and 1,2-dichloroethane. The solvent is generally used in an amount providing a monomer concentration of 0.1–5 mole/l, preferably 1–2 mole/l.

Polymerization can be conducted usually at a temperature of 30° C.–100° C., preferably 50° C.–100° C., more preferably 70° C.–90° C., for 12–36 hours.

The polymerized product may be purified by any known method, for example, by adding the polymer solution into a larger amount of a poor solvent (such as methanol) to precipitate the polymer, followed by filtrating and drying.

Alkyldimethylsilyl propyne polymers thus obtained are white solids in fibrous or powdered form.

Weight-average molecular weight of the polymers, determined by light scattering method, is usually at least 10,000, preferably at least 100,000. Polymers obtained by using TaCl$_5$ or TaBr$_5$ as the catalyst have higher molecular weight, such as 100,000–2,000,000 or higher. Intrinsic viscosity is generally at least 0.5 dl/g, preferably 1.0–10.0 or more.

Polymers according to the present invention are formable into films. They are soluble in various organic solvents as described above (solvents for polymerization) and below (solvents for forming membranes). They are particularly useful for producing permselective membranes.

In producing the membrane the polymer according to this invention is dissolved in one or more solvents to form a polymer solution, which is cast to form a film.

Exemplary suitable solvents include hydrocarbons, for instance, aromatic hydrocarbons, such as benzene, toluene and xylene, cycloaliphatic hydrocarbons, such as cyclohexane, and aliphatic hydrocarbons, such as n-hexane and petroleum ethers; and halogenated hydrocarbons, such as carbon tetrachloride, trichloroethane, trichloroethylene, and the like.

Amoung these, aliphatic hydrocarbons are preferred (b.p.: generally 30°–99° C. preferably 35°–70° C.; particularly n-hexane and petroleum ethers) and mixtures thereof with minor amount (usually 0-50% preferably 0-30% based on the weight of the total solvent) of other solvents (aromatic hydrocarbons, cycloaliphatic hydrocarbons, halogenated hydrocarbons, or mixtures of two or more of them).

Production of membranes from polymer solutions may be done according to any known methods, such as those described in Japan Patent Lay-open No. 166903/1981, for instance, by casting a polymer solution onto a smooth plain surface of solid (such as metal, glass and the like) or liquid (such as water) followed by evaporating the solvent. Preferred are methods of dropping a dilute polymer solution on a liquid surface (particularly water surface) and then spreading spontaneously on the surface followed by evaporating the solvent to form a ultra thin membrane, which methods can provide membranes free from any serious defeats (such as pin holes) and having a large area.

Besides, molding or forming techniques (such as extrusion technique), generally employed for thermoplastics, may also be applied to obtain membranes.

Membranes composed of one or more alkyldimethylsilyl propyne polymers according to this invention may optionally contain, as mixture or as composite, one or more other polymers.

Examples of suitable polymers include:

(i) Polyorganosiloxanes, such as polydimethylsiloxanes, polymethylphenylsiloxanes, polydiphenylsiloxanes, and derivatives of them (such as polydimethylaminoalkyl (C2-5) methylsiloxanes); and (ii) olefinic polymers, for example, polymers (including copolymers) of α-olefines having 2-15 carbon atoms, such as 4-methylpentene-1.

Other examples of suitable polymers are:

(iii) cellulosic materials, including cellulose and derivatives thereof such as cellulose ethers (ethyl cellulose, hydroxyethyl cellulose, carboxymethyl cellulose, and the like), and cellulose esters (cellulose acetates, such as triacetate, cellulose acetate butyrate, and the like);

(iv) polyalkylsulfones such as copolymers of α-olefins and $SO_2$, preferably polymers of long chain alkyl (C10-20) sulfones; and (v) nitrogen atom-containing polymers, including polymers of tertiary amine-containing vinylmonomers, such as vinylpyridines, N,N-diethylaminoethylacrylate, N,N-dimethylaminostyrene, and the like.

(vi) 1-alkyne polymers, such as those having repeating units of the formula:

(2)

wherein $R_1$ is an alkyl radical, particularly branched alkyl radical, having 4-10 carbon atoms, for instance, polymers of t-butyl acetylene, 4-methyl-1-pentyne, 3-methyl-1-pentyne, neopentyl acetylene, t-pentyl acetylene, t-hexyl, acetylene, and 1-hexyne; and (vii) polyvinylorganosilanes, such as those having repeating units of the formula:

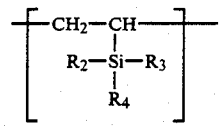

(3)

wherein $R_2$ is H, C1-12 alkyl, cycloalkyl or aryl radical, and $R_3$ and $R_4$, which may be the same or different, are C1-12 alkyl, cycloalkyl or aryl radicals, for example, polymers of vinyltrimethylsilane, vinyltriethylsilane, vinyltripropylsilane, vinyltributylsilane, vinyldimethylethylsilane, vinyltricyclohexylsilane, vinyldimethylcyclohexylsilane, and vinyldimethylphenylsilane.

Among these polymes, preferred are poly-1-alkynes, polyvinylorganosilanes such as polyvinyltrimethylsilanes, polyalkyl (c10-20) sulfones, poly- -olefines and alkylcelluloses.

Membranes, composed of at least one alkyldimethylsilyl propyne polymer (a) and at least one other polymer (b), may be produced by mixing these polymers (a) and (b) usually in the form of solutions followed by processing to a membrane; or by processing one of the polymers [for instance, the polymer (a)] to a membrane, onto which thereafter the other polymer [the polymer (b)] is coated to form a multi-layer composite membrane; or by combination of these methods.

In membranes composed of said polymers (a) and (b), content of said polymer (a) is usually at least 20%, preferably at least 70% by weight.

Membranes composed of said polymer (a) and optionally the other polymer (b), may contain, if desired, various additives such as plasticizers (esters such as dioctyl phthalate; and higher alcohols or amines having at least 5 carbon atoms, and the like) to improve processability and spreadability of ultrathin membranes.

Membranes according to the invention can take any form of membranes, such as plain filmy, tubular and hollow fibrous forms.

Thickness of membranes, which may vary widely, is usually 0.01-100μ, preferably 0.05-20μ, in view of practical strength and sufficient permeability.

If necessary, membranes may be supported on one more backing layers to form composites. Suitable materials, used as support, include porous or microporous materials manufactured by various ways, such as extraction, paper-making, phase separation, stretching, and so on. Examples of suitable supports are papers, including Japanese paper, filter paper, synthetic paper, and the like; plastic films, including ultrafiltration membrane and filtration membrane, for example, porous polypropylene film, such as Duragard (brand Name, Celanease Corp.); fabrics, including textile materials such as woven fabrics, knits and non-woven fabrics; and porous glass. Among these preferred are porous polypropylene films such as Duragard and other ultrafiltration membranes.

Thickness of the support is not particularly critical, but is preferbly 1μ-5 mm, more preferably 10μ-1 mm.

Composite membranes can be produced by any known methods. For instance, a thin film formed on water surface is taken out and pressed on a support, or a thin film on water surface is dipped up with a support or sucked through a support to form a composite. If necessary, adhesive may be applied, preferably in scattered way, between the membrane and the support to adhere them. Composite membranes may undertake further heat treatment.

Permselective membranes according to the present invention exhibit an improved oxygen permeability constant, which may range generally $10^{-9}$–$10^{-6}$ cc·cm/cm$^2$·sec·cmHg, preferably $10^{-8}$–$10^{-6}$ cc·cm/cm$^2$·sec·cmHg; and also enough oxygen/nitrogen separation factor, which may range 1.5–5.

Membranes of this invention have excellent selectivity comparable to those composed of polydimethylsiloxanes, as well as remarkably improved oxygen permeability, say about ten times as high as that of polydimethylsiloxanes.

In addition, alkyldimethylsilyl propyne polymers according to this invention can be readily processed into thin membranes, and their processability is comparable to that of poly-α-olefins.

Permselective membranes of this invention, having such outstanding virtues as above, yield great advantages for oxygen-enrichment from air, and can be applied to various oxygen-enriching devices, such as engines, boilers, stoves, and other combustors, so as to improve combustion efficiency. Saving of energy of 30–50 percent would be expected by applying to combustion systems membranes according to this invention. Membranes according to the invention can be applicable, for instance, to oxygen-enriching combustion system as described in "NIKKEI PLASTICS", October, 1981, Page 8.

Furthermore, membranes of this invention may be useful for breathing systems, such as incubators for premature or immature babys, curers for respiratory diseases, artificial lungs and artificial gills, as well as contact lens.

Having generally described the invention, a more complete understanding can be obtained by reference to certain specific examples, which are included for purposes of illustration only and are not intended to be limiting unless otherwise specified.

EXAMPLE 1

Polymerization of 1-trimethylsilyl propyne (produced by Petrarch System Inc., T3728) was carried out using TaCl$_5$ as the catalyst and toluene as the solvent, under the following conditions:

Monomer concentration: 1.0M
Catalyst concentration: 20 mM
Polymerization temperature: 80° C.
Polymerization time: 24 hours The resulting viscous polymer gel was diluted with toluene to a concentration of 1% by weight. Then the dilute solution was added into a larger amount of methanol to precipitate the polymer, which was then filtered off followed by drying.

Figure 1B:
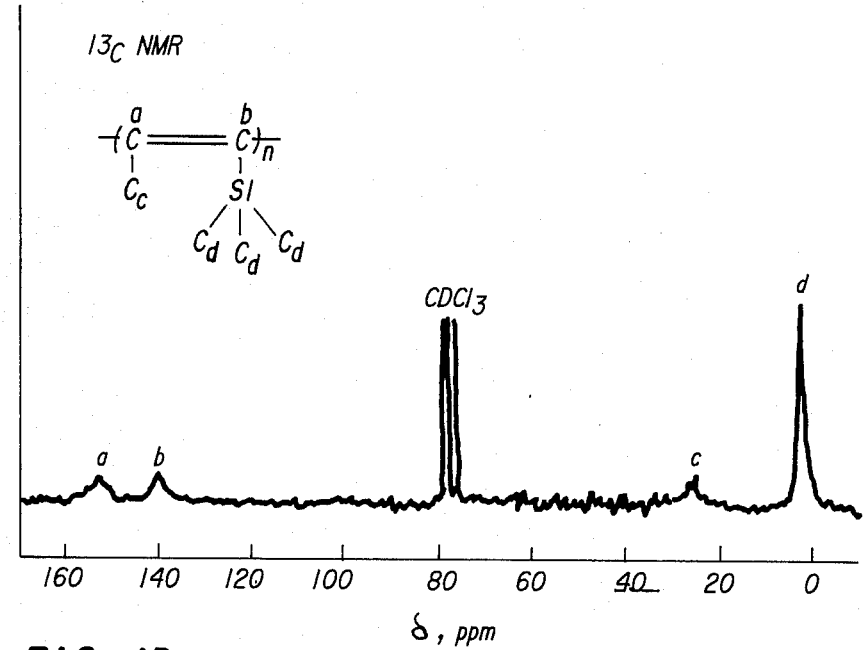
Figure 2:
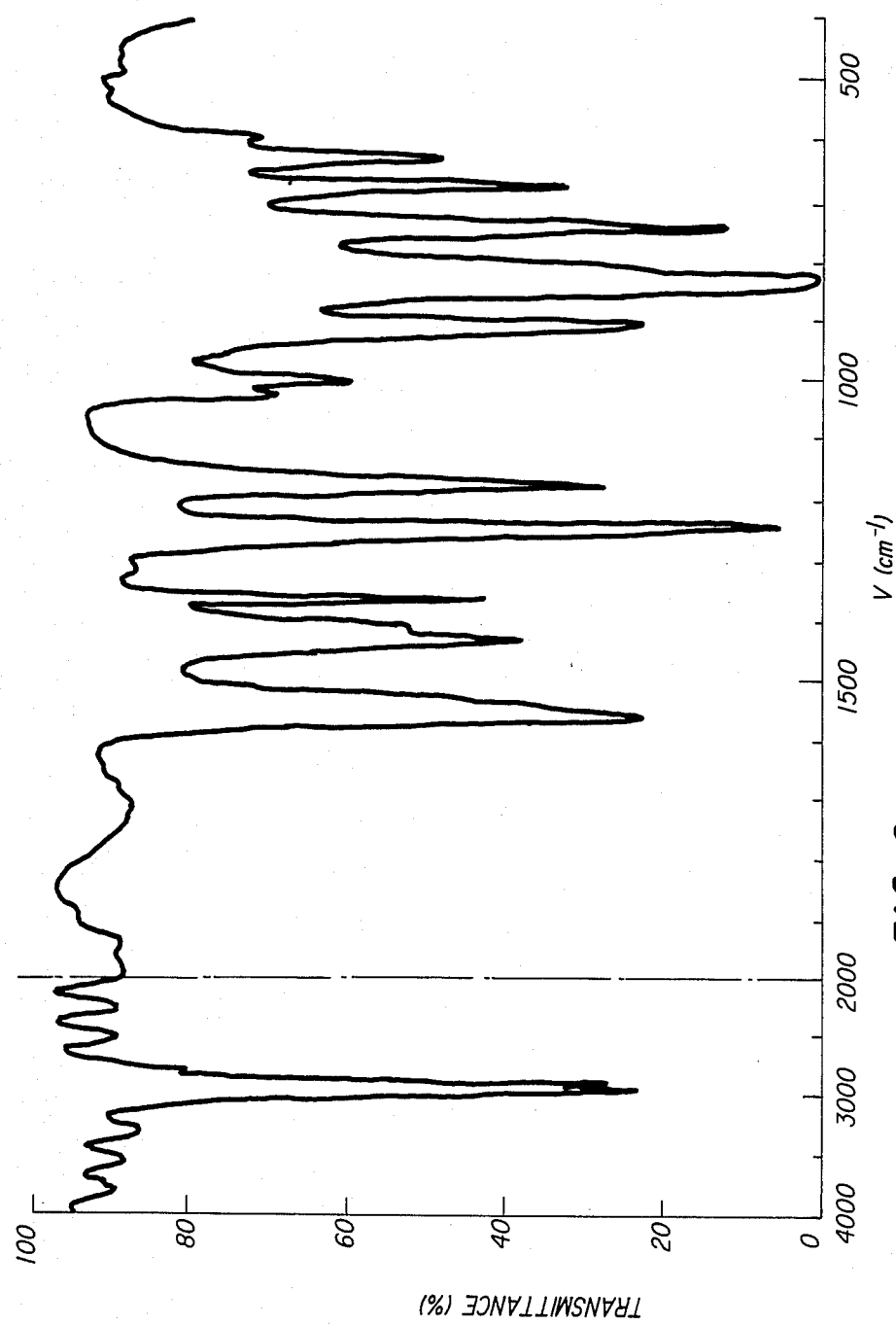
FIG. 2.

The 1-trimethylsilyl propyne polymer thus obtained was identified by $^1$H NMR analysis (nuclear magnetic resonance) spectra and IR (infrared) spectrum, which were as shown in FIGS. 1 and 2, respectively; as well as by analysis of UV (ultraviolet) spectrum and elemental analysis, results of which were as follows:

UV Spectral Data (in 5 mM cyclohexene solution): λmax: 273 nm, εmax: 120 cm$^{-1}$·(mol/l)$^{-1}$.

Elemental analysis: C 64.1%, H 10.98%, Si 24.92%.

EXAMPLES 2–6

Example 1 was repeated except using the catalyst and the solvent written in Table 1.

Polymers obtained in Examples 1–6 have intrinsic viscosity [η] measured in toluene at 30° C., and weight-average molecular weight ($\overline{M}w$) determined by light scattering method, as shown in Table 1.

TABLE 1

| Example | Solvent | Catalyst | Yield, % | [η], dl/g | $\overline{M}w$, × 10$^4$ |
|---|---|---|---|---|---|
| 1 | Toluene | TaCl$_5$ | 100 | 5.5 | 87 |
| 2 | Toluene | TaBr$_2$ | 90 | 3.8 | 62 |
| 3 | Cyclohexane | TaCl$_5$ | 100 | 6.0 | 93 |
| 4 | Toluene | NbCl$_5$ | 100 | 0.99 | 32 |
| 5 | Toluene | NbBr$_5$ | 100 | 0.63 | 27 |
| 6 | 1,2-Dichloro-ethane | TaCl$_5$ | 100 | 2.2 | 40 |

EXAMPLE 7 AND 8

Example 1 was repeated except that, instead of 1-trimethylsilyl propyne, was used the monomer as written in Table 2.

The monomers, used in these Examples, were produced by reacting lithium propyne with ethyl- or propyl-dimethylchlorosilane, which was prepared by reacting ethylene or propylene with dimethylchlorosilane.

Polymers obtained in Examples 7 and 8 have [η] and $\overline{M}w$ as shown in Table 2.

TABLE 2

| Example | Monomer | Yield, % | [η], dl/g | $\overline{M}w$, × 10$^4$ |
|---|---|---|---|---|
| 7 | Ethyldimethylsilyl propyne | 100 | 3.2 | 54 |
| 8 | n-Propyldimethylsilyl propyne | 100 | 2.8 | 46 |

Results of elemental analysis of these polymers were as follows:

Polymer of Example 7: C 66.6%, H 11.1%, Si 22.2%.
Polymer of Example 8: C 68.6%, H 11.4%, Si 20.2%.

Figure 3:
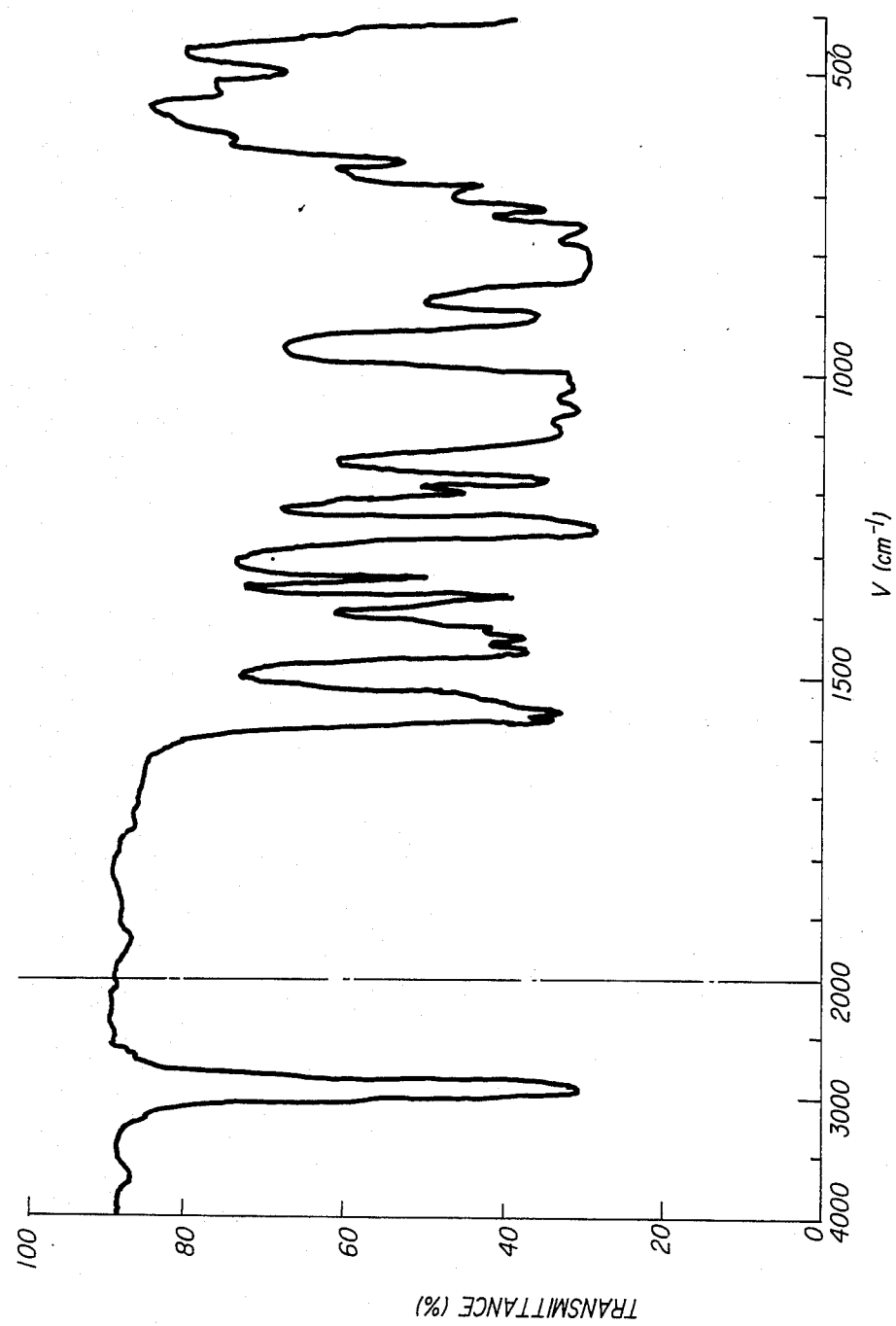
FIG. 3 are IR charts of a poly-1-trimethylsilyl propyne and a poly-1-n-propyldimethylsilyl propyne, respectively.

IR spectrum of the polymer of Example 8 were as shown in FIG. 3.

EXAMPLE 7–11

Each polymer of Example 1, 2, 3, 7 and 8 was dissolved again in toluene to a concentration of 2% by weight, followed by casting the solution on a glass plate to form a membrane.

Oxygen, nitrogen and hydrogen permeabilities of these membranes were determined by using a gas permeability tester produced by RIKASEIKI KOGYO, JAPAN.

The results were as shown in Table 3.

TABLE 3

| Example | Polymer | P* PO$_2$ | PN$_2$ | PH$_2$ | PO$_2$/PN$_2$ |
|---|---|---|---|---|---|
| 7 | of Example 1 | 52 | 26 | 88 | 2.0 |
| 8 | of Example 2 | 63 | 28 | 101 | 2.2 |
| 9 | of Example 3 | 57 | 28 | 12 | 2.0 |
| 10 | of Example 7 | 9.0 | 4.0 | 17.0 | 2.3 |
| 11 | of Example 8 | 1.0 | 0.3 | 3.2 | 3.3 |

*Gas-permeability constant, 10$^{-8}$ cm$^3$(STP) cm/cm$^2$ · sec · cmHg

What is claimed as new and intended to be covered by Letters Patent is:

1. A permselective membrane having an improved gas-permeabilty, said membrane being comprised of a polymer having an O$_2$ permeability constant of about 10$^{-9}$ to about 10$^{-6}$ cc·cm/cm$^2$·sec·cmHg, wherein said polymer has repeating units of the formula:

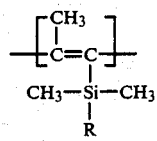

wherein R is an alkyl radical containing 1–4 carbon atoms.

2. The membrane of claim 1, wherein the polymer has a molecular weight of at least 10,000.

3. The membrane of claim 1, wherein the polymer is a polymer of 1-trimethylsilyl-1-propyne.

4. The membrane of claim 1, which has a thickness of 0.01–100μ.

5. The membrane of claim 1, which has an $O_2/N_2$ separation factor of about 1.5–about 5.

6. The membrane of claim 1, composed of the polymer (a) having the repeating units of the formula (1), and at least one polymer selected from the group consisting of polyorganosiloxanes, olefinic polymers, cellulosic materials, polyalkylsulfones, and nitrogen atom-containing polymers.

7. The membrane of claim 6, which contains said polymer (a) in an amount of at least 20% by weight.

8. The membrane of claim 1, which has a backing layer of at least one porous material selected from the group consisting of papers, porous or microporous plastic films, fabrics and porous glass.

9. The membrane of claim 1, having an $O_2$ permeability constant of about $10^{-8}$ to about $10^{-6}$ cc·cm/cm²·sec·cmHg.

10. A method for separating a specific gas from a gas mixture, by using a permselective membrane comprised of a polymer having repeating units of the formula:

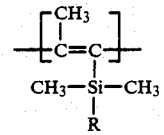

wherein R is an alkyl radical containing 1 to 4 carbon atoms.

11. The method of claim 10, wherein the membrane has an $O_2$ permeability constant of about $10^{-9}$ to about $10^{-6}$ cc·cm/cm²·sec·cmHg.

12. The method of claim 10, wherein the polymer has a molecular weight of at least 10,000.

13. The method of claim 10, wherein the polymer is a polymer of 1-trimethylsilyl-1-propyne.

14. The method of claim 10, wherein said membrane has a thickness of 0.01–100μ.

15. The method of claim 10, wherein said membrane has an $O_2/N_2$ separation factor of about 1.5–about 5.

16. The method of claim 10, wherein said membrane is composed of the polymer (a) having the repeating units of the formula (I), and at least one polymer selected from the group consisting of polyorganosiloxanes, olefinic polymers, cellulosic materials, polyalkylsulfones and nitrogen atom-containing polymers.

17. The method of claim 16, wherein said membrane contains said polymer (a) in an amount of at least 20% by weight.

18. The method of claim 10, wherein said membrane has a backing layer of at least one porous material selected from the group consisting of papers, porous or microporous plastic films, fabrics and porous glass.

* * * * *